(12) United States Patent
Baker et al.

(10) Patent No.: US 8,644,266 B2
(45) Date of Patent: Feb. 4, 2014

(54) SYSTEM AND METHOD FOR OPERATING A RADIO COMMUNICATION APPARATUS WITH A COMMUNICATION CHANNEL FOR DISCONTINUOUS DATA TRANSMISSION

(75) Inventors: Matthew P. J. Baker, Canterbury (GB); Timothy J. Moulsley, Caterham (GB)

(73) Assignees: Koninklijke Philips N.V., Eindhoven (NL); Sharp Corporation, Osaka (JP)

(*) Notice: Subject to any disclaimer, the term of this patent is extended or adjusted under 35 U.S.C. 154(b) by 1049 days.

(21) Appl. No.: 12/063,593

(22) PCT Filed: Aug. 10, 2006

(86) PCT No.: PCT/IB2006/052768
§ 371 (c)(1),
(2), (4) Date: Feb. 12, 2008

(87) PCT Pub. No.: WO2007/020575
PCT Pub. Date: Feb. 22, 2007

(65) Prior Publication Data
US 2010/0177745 A1    Jul. 15, 2010

(30) Foreign Application Priority Data
Aug. 16, 2005  (EP) .................................... 05107537

(51) Int. Cl.
*H04W 84/12* (2009.01)
(52) U.S. Cl.
USPC .......... 370/336; 370/322; 370/326; 370/341; 370/345; 455/434; 455/450; 455/464; 455/509

(58) Field of Classification Search
USPC .......... 370/336, 322, 326, 341, 345; 455/434, 455/450, 464, 509
See application file for complete search history.

(56) References Cited

U.S. PATENT DOCUMENTS

| | | | |
|---|---|---|---|
| 6,381,229 B1 * | 4/2002 | Narvinger et al. | 370/328 |
| 6,747,963 B1 | 6/2004 | Park et al. | |
| 6,816,507 B1 | 11/2004 | Jarbot et al. | |
| 6,859,445 B1 * | 2/2005 | Moon et al. | 370/335 |
| 6,868,075 B1 * | 3/2005 | Narvinger et al. | 370/335 |
| 7,636,551 B2 * | 12/2009 | Ue et al. | 455/63.1 |
| 2001/0053140 A1 * | 12/2001 | Choi et al. | 370/335 |
| 2002/0051439 A1 * | 5/2002 | Kitade et al. | 370/337 |
| 2002/0191578 A1 | 12/2002 | Bachl et al. | |

(Continued)

FOREIGN PATENT DOCUMENTS

| | | | |
|---|---|---|---|
| EP | 1039657 A1 | 9/2000 | |
| WO | 0062456 A1 | 10/2000 | |

(Continued)

*Primary Examiner* — Brandon Renner
*Assistant Examiner* — Abdelnabi Musa (57) ABSTRACT

In a radio communication system (100, 200) using a channel divided into a plurality of time slots, a control signal is transmitted in each time slot and a data signal is transmitted intermittently using a subset of the time slots. The control signal includes a portion which is a predetermined signal, such as a pilot signal, and one or more bits constituting a power control command. The format of the control signal is adapted according to whether or not data is transmitted in the same time slot. When data is not being transmitted, the proportion of the control signal which constitutes a power control command is increased and the energy of the control signal is reduced, at least by reducing the energy of the predetermined signal portion.

27 Claims, 3 Drawing Sheets

(56) References Cited

U.S. PATENT DOCUMENTS

2003/0039217 A1* 2/2003 Seo et al. ............... 370/318
2004/0259584 A1* 12/2004 Murata et al. ............ 455/522
2005/0163075 A1   7/2005 Malladi et al.

FOREIGN PATENT DOCUMENTS

| WO | 02101941 A2 | 12/2002 |
| WO | 2005020463 A1 | 3/2005 |
| WO | 2006033059 A1 | 3/2006 |

* cited by examiner

SYSTEM AND METHOD FOR OPERATING A RADIO COMMUNICATION APPARATUS WITH A COMMUNICATION CHANNEL FOR DISCONTINUOUS DATA TRANSMISSION

The invention relates to a radio communication apparatus for use with a communication channel divided into a plurality of time slots, to a method of operating such a radio communication apparatus, a radio communication to system including such a radio communication apparatus, and to a method of operating such a radio communication system. The invention has application in, for example but not exclusively, the Universal Mobile Telecommunication System (UMTS).

Mobile communications systems, such as UMTS, typically comprise data channels for the transmission of data packets and control channels for the transmission of control information. The data channels and control channels are transmitted in time slots of predetermined duration.

By way of example, in UMTS, uplink data is transmitted using the Enhanced Dedicated Channel (E-DCH) and downlink data is transmitted using the High-Speed Downlink Shared Channel (HS-DSCH). These data channels are designed to be highly variable in data rate and to be not transmitted when there is no data to transmit. In parallel with these data channels, control channels are also transmitted. For example, in UMTS three uplink control channels are used, the DPCCH (Dedicated Physical Control Channel), the HS-DPCCH (High Speed Dedicated Physical Control Channel) and the E-DPCCH (Enhanced Dedicated Physical Control Channel).

The E-DPCCH primarily carries information to enable the Base Station (BS) to decode the E-DCH data, and is only transmitted when E-DCH data is being transmitted. The HS-DPCCH carries data such as automatic repeat request (ARQ) acknowledgements for the downlink HS-DSCH data and periodic downlink channel quality indicators (CQI); the HS-DPCCH is usually not transmitted unless positive or negative acknowledgements (ACK/NACK) or CQI need to be transmitted.

The DPCCH carries at least pilot bits and power control commands. The pilot bits are of predetermined value and provide a phase reference for the decoding of other uplink channels and DPCCH fields, and may be used for channel estimation. The pilot bits may also be used by the BS to measure the uplink signal-to-interference ratio (SIR) for the purpose of generating the power control commands that are transmitted on the downlink.

In many packet data applications, such as web browsing and email, the to data transmission is bursty, with periods of high data rates interspersed with "reading periods" when no data is transmitted. During periods when no data is transmitted, it is advantageous to minimise the overheads of running the control channels in order to reduce interference to other users. However, for a good user experience, it is also necessary to minimise delays at the start of each burst of data packets. For this reason the uplink and downlink DPCCHs are typically kept running to maintain the closed-loop power control and avoid lengthy set-up delays and power control convergence periods.

One way, included in Release 6 of the UMT specifications, of reducing the downlink control channel overheads is to employ a Fractional Dedicated Channel (F-DPCH), which comprises only power control commands and therefore enables multiple users' control channels to be multiplexed together in a time-division manner within timeslots. This is possible for the downlink as a common pilot channel (CPICH) exists which can be used as the phase reference for the power control commands. For the uplink, however, no other phase reference is available than the pilot bits provided by the DPCCH, so it is necessary to continue to transmit both phase reference and power control information.

In a communication system, and in CDMA communication systems in particular, it is generally desirable to minimise the amount of transmission, and the transmission power level, in order to minimise the possibility of causing interference to other users of the system, and hence to maximise the system capacity for other users. Minimising the amount of transmitted energy also has the advantage of increasing the battery life of mobile terminals.

One problem with the uplink DPCCH is that the pilot field has to provide the channel estimate for decoding data channels when data is transmitted. However, this means that the amount of pilot energy is excessive for the periods between data transmission, when only power control commands have to be decoded.

One possible technique is to reduce the transmission power level of the DPCCH when data is not being transmitted. This power reduction may be to applied to the whole DPCCH, or just to the pilot field. If it is applied to the whole DPCCH, it will affect the reliability of the power control commands, either making them unnecessarily reliable when data is transmitted or making them too unreliable when data is not transmitted. If the power reduction is applied only to the pilot field, the resulting transmission power of the DPCCH will be non-uniform, which is undesirable because it is then necessary for the transmitter to adjust the transmit power more than once per timeslot, thus increasing the complexity of the device.

An object of the present invention is to reduce the likelihood of interference.

According to a first aspect of the invention there is provided a method of operating a radio communication apparatus for use with a communication channel divided into a plurality of time slots, comprising: transmitting data in a first subset of the time slots; refraining from transmitting data in a second subset of the timeslots; transmitting a control signal in each of the time slots, wherein the control signal in the first subset of time slots comprises at least one bit constituting a power control command and a portion which is a predetermined signal; and, for at least some of the second time slots, and relative to the first time slots, increasing the proportion of the control signal which constitutes a power control command and reducing the energy of the control signal at least by reducing the energy of the predetermined signal portion.

According to a second aspect of the invention there is provided a radio communication apparatus for use with a communication channel divided into a plurality of time slots, comprising: means for transmitting data in a first subset of a plurality of time slots and refraining from transmitting data in a second subset of the plurality of time slots; means for generating a first control signal, wherein the first control signal comprises a portion which is a predetermined signal and at least one bit constituting a power control command; means for transmitting the first control signal in the first subset of time slots; means for generating a second control signal, having, relative to the first control signal, to an increased proportion of the control signal which constitutes a power control command; and means for transmitting the second control signal in at least some of the second subset of time slots and with, relative to the transmission of the first control signal, a reduced energy, wherein the reduction comprises at least the energy of the predetermined signal portion.

Interference is reduced by adapting the control signal format according to whether or not data is currently being transmitted, and by reducing the energy of the control signal.

The adaptation of the control signal format comprises increasing the proportion of the control signal which constitutes a power control command during time slots in which data is not transmitted. By means of such an increase, the reliability of decoding the power control command bits can be maintained, thus ensuring that closed loop power control continues to operate effectively whether or not data is being transmitted.

The transmitted energy of the control signal is reduced by reducing at least the energy of the predetermined signal portion. Such a predetermined signal portion may be used by a receiver for generating a phase reference and for channel estimation. The predetermined signal portion may comprise bits of predetermined value. A reduction in energy of the predetermined signal portion is acceptable during time slots in which data is not transmitted because a control signal, and in particular the bit or bits constituting a power control command, may be demodulated successfully despite the reduced energy. The reduction in energy of the predetermined signal portion may likewise be acceptable during time slots in which certain types of data is transmitted if those particular types of data may be demodulated successfully despite the reduced energy.

The adaptation and energy reduction need not occur simultaneously with the starting and stopping of data transmission, but the control signal format and control signal energy used during data transmission may also be used temporarily during some of the time slots in which no data is transmitted, although in this case the reduction in interference is not maximised.

The energy of the predetermined signal portion may be reduced by to reducing the time duration of the portion, for example by reducing the number of bits of predetermined value. This has the advantage that the number of power control command bits need not be changed, thereby enabling a simple encoder for encoding the control signal and a simple decoder for decoding the control signal, whether or not data is being transmitted.

The energy of the control signal may reduced by reducing the transmitted power level of the control signal. This has the advantage of reducing the peak and average interference level. The reliability of decoding the power control command bits may be at least partially maintained despite the power reduction, by increasing the proportion of control signal which constitutes a power control command.

The energy of the control signal may be reduced by discontinuing transmission of the control signal during a portion of the time slot. This has the advantage of eliminating interference caused by the control signal during a portion of the time slot.

Advantageously, where discontinuous transmission of the control signal is employed, the transmission of the control signal is confined to either or both ends of the time slot. In some systems, this may have the advantage of maintaining a constant update rate for a power control loop.

The increase in the proportion of the control signal which constitutes a power control command may result in equal, or approximately equal, numbers of bits being employed for pilot bits and power control bits. This provides approximately equal reliability for these pilot bits and power control bits, with increased reliability for the pilot bits in the slots in which data is also transmitted.

Optionally, the bits of predetermined value and the power control bits may be transmitted in separate fields. Alternatively, they may occupy a common field, or fields, with the combined bits comprising a code word selected from a set of fully-orthogonal or partially-orthogonal code words. Such an embodiment is advantageous for certain types of receiving process, for example non-coherent detection using a correlator.

In one embodiment, also advantageous for certain types of receiving to process such as non-coherent detection using a correlator, the increase in the proportion of control signal used for power control may result in all of the bits of predetermined value being replaced by power control bits, with none of the remaining bits having a predetermined value.

The changeover between control signal formats and energy levels may be initiated autonomously by the apparatus transmitting the control signal. Such a changeover can be made quickly, resulting in maximum reduction of interference. Alternatively, the changeover may be made in response to a signal received from a radio station to which the data is transmitted. Such a signal may be, for example, a grant of permission to transmit data.

If the apparatus is in communication with more than one radio station simultaneously, the changeover may be conditional on the radio stations sharing a predetermined common property, as determined by either the apparatus or a radio station. Such a condition can ensure, for example, that the changeover of control format is employed only in conjunction with radio stations that are equipped to decode the changing control signal format. Some further examples of a common property are: being co-located; being equipped to jointly determine permission to transmit; being equipped to generate identical transmit power control commands.

According to a further aspect of the invention there is provided a method of operating a communication system comprising a radio communication apparatus and at least one radio station for receiving signals transmitted by the radio communication apparatus, the method comprising: operating the radio communication apparatus in accordance with the first aspect of the invention; determining, at the radio station, that the radio communication apparatus has no data to transmit in a particular time slot or group of time slots, and/or that the radio communication apparatus has no permission to transmit data; and in response to said determining, transmitting an indication to the radio communication apparatus; and wherein, at the radio communication apparatus, increasing the proportion of the control signal which constitutes a power control command and reducing the energy of the control signal is responsive to receiving the indication.

According to a further aspect of the invention there is provided a radio communication system comprising a radio communication apparatus according to the second aspect of the invention, and a radio station having control means for determining that the radio communication apparatus has no data to transmit in a particular time slot or group of time slots, and/or that the radio communication apparatus has no permission to transmit data, wherein the control means is adapted to initiate transmission of the indication in response to said determining.

The invention will now be described, by way of example only, with reference to the accompanying drawings wherein:

FIGS. 1 to 6 illustrate examples of formats suitable for control signals transmitted in the time slots of a UMTS DPCCH control channel. The duration of each slot is 10 bits, corresponding to 2560 chips, and one radio frame of 10 ms duration comprises 15 time slots.

Figure 1:
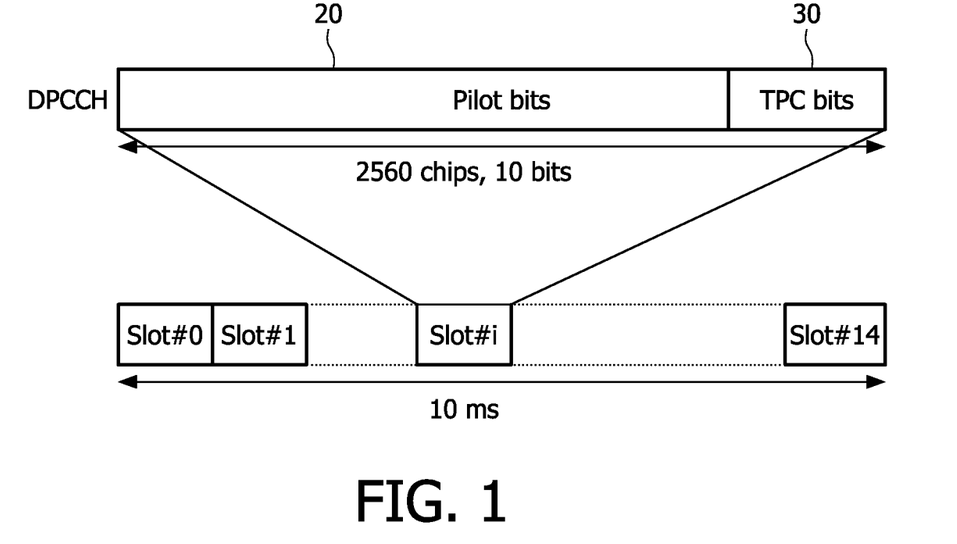
FIG. 1 illustrates a DPCCH time slot format for use during data transmission.

FIG. 1 illustrates a format for a control signal transmitted in a time slot also containing data transmission, and FIGS. 2 to 6 illustrate some possible formats in accordance with the present invention for a control signal transmitted in a time slot that does not contain data transmission.

Figure 2:
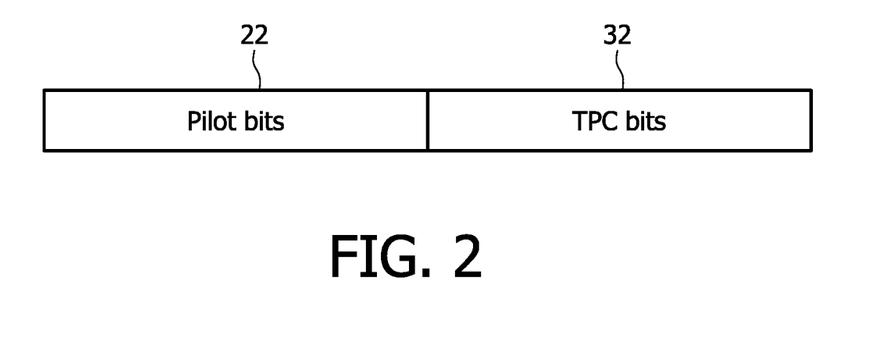
FIG. 2 illustrates a first modified time slot format.

In FIG. 1, the control signal comprises eight pilot bits, 20, and two bits for a transmit power control (TPC) command, 30. The pilot bits are in the majority of 80%, and enable the data transmission to be decoded reliably. In FIG. 2, the control signal comprises a higher proportion of TPC bits, in this example five pilot bits, 22, and five TPC bits, 32. By increasing the number of TPC bits by a ratio 5/2, to 50%, the control signal transmit power may be reduced by a factor 5/2=4 dB, whilst maintaining substantially the same decoding reliability for the TPC bits as for the format of FIG. 1. Consequently, the transmitted energy of the control signal is reduced, and the potential interference caused by the control signal is reduced by 4 dB. The reduced proportion of pilot bits, by a ratio 3/8, and their reduced power, is adequate to permit decoding of the TPC bits in the absence of data in that time slot.

One possible drawback of the format of FIG. 2 is that the loop delay of the downlink closed-loop power control may have to be increased from one slot to two slots, because the TPC bits start earlier in the time slot which reduces the time available for deriving the TPC command prior to transmission. However, as this format is used when no data is being transmitted, the impact of such an additional delay is not likely to be significant, and in any case the downlink power control is less critical than the uplink. Further, when an F-DPCH is being used, the loop delay is already two slots and is not increased further.

Figure 3:
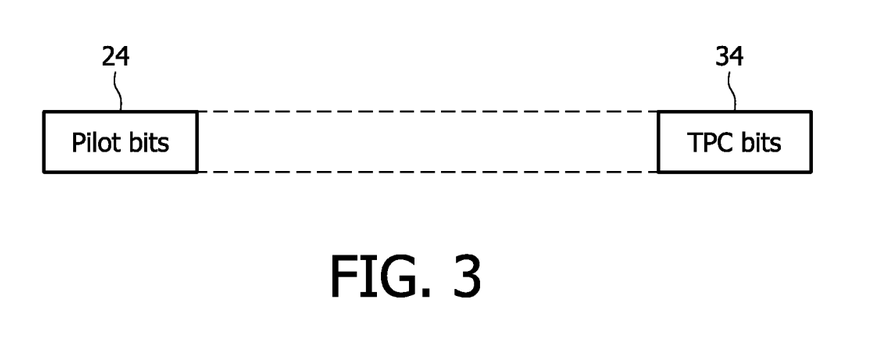
FIG. 3 illustrates a second modified time slot format.

In FIG. 3, the control signal comprises two TPC bits, 34, the same as in FIG. 1, but the number of pilot bits, 24, is reduced from eight to two. During the portion of the time slot between the pilot bits and the TPC bits, denoted by the broken line in FIG. 3, transmission of the control signal is discontinued. Therefore, 50% of the control signal bits are pilot bits and 50% are TPC bits. The average potential interference caused by the control signal is reduced, relative to the format of FIG. 1, by 4 dB due to the discontinuous transmission.

An advantage of the format of FIG. 3 is that the length of the TPC field is unaffected by the change of slot format from that of FIG. 1. This feature can be useful in making the decoding of the TPC bits more robust in the presence of uncertainty as to which slot format was transmitted.

Figure 4:
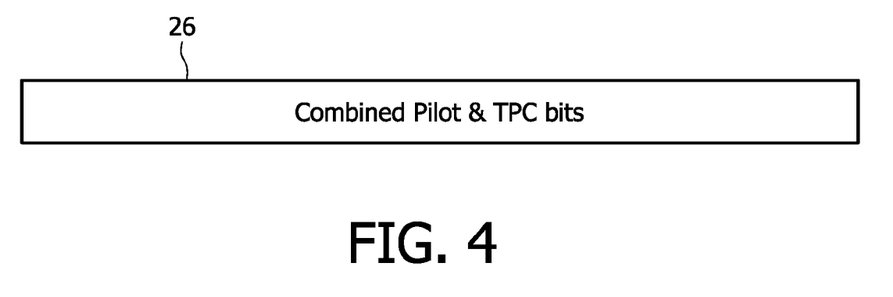
FIG. 4 illustrates a third modified time slot format.

In FIG. 4, the pilot bits and TPC bits are combined into a common 10-bit field 26, with the bits interleaved. There may be, for example five pilot bits and five TPC bits, enabling the same power reduction as for the format of FIG. 2. Distributing the bits across the time slot in this way can result in improved decoding reliability in a time varying radio channel.

Figure 5:
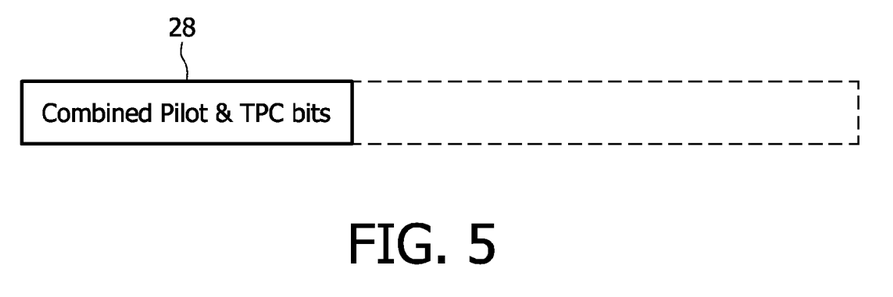
FIG. 5 illustrates a fourth modified time slot format.

In FIG. 5, the pilot bits and TPC bits are combined into a common 4-bit field 28, with the bits interleaved, and transmission of the control signal is discontinued during the latter portion of the time slot, denoted by the broken line in FIG. 5. Therefore, 50% of the control signal bits are pilot bits and 50% are TPC bits. The average potential interference caused by the control signal is reduced, relative to the format of FIG. 1, by 4 dB due to the discontinuous transmission.

Figure 6:
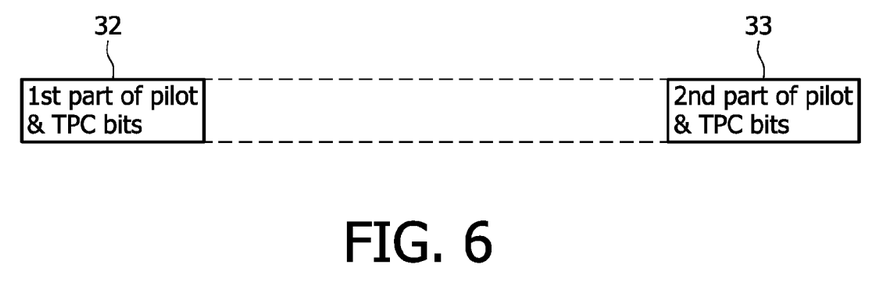
FIG. 6 illustrates a fifth modified time slot format.

FIG. 6 illustrates a variant of the format of FIG. 5, in which the common field is divided into separate portions 32, 33 of the time slot. Such an arrangement facilitates maintenance of a 1-slot loop-delay of the downlink power control.

The bits transmitted in the common field of FIG. 4, 5 or 6 may comprise a codeword selected from a set of fully- or partially-orthogonal code words. The number of available codewords in the set would depend on the number of distinct values of power control command to be transmitted. In an embodiment with simple power control functionality, a set of two code words would suffice. An example of a set of two 4-bit code words is as follows:

"1, 1, 1, 1" signifying "power up"
"−1, 1, −1, 1" signifying "power down"

The second and fourth bit locations contain values which are common to both code words, and function as pilot bits. Therefore, at least 50% of the control bits may be regarded as TPC bits.

An example of a set of four 4-bit code words is as follows:

"1, 1, 1, 1" signifying "power up, large amount"
"1, 1, −1, −1" signifying "power up, small amount"
"−1, 1, 1, −1" signifying "power down, large amount"
"−1, 1, −1, 1" signifying "power down, small amount"

The second bit location contains a value that is common to all four code words, to and function as a pilot bit. Therefore, at least 75% of the control bits may be regarded as TPC bits.

For certain types of receiving process, such as non-coherent detection of TPC bits using a correlator, pilot bits are not required and so the number of pilot bits may be reduced to zero, resulting in 100% of the control signal bits being available as power control bits.

Figure 7:
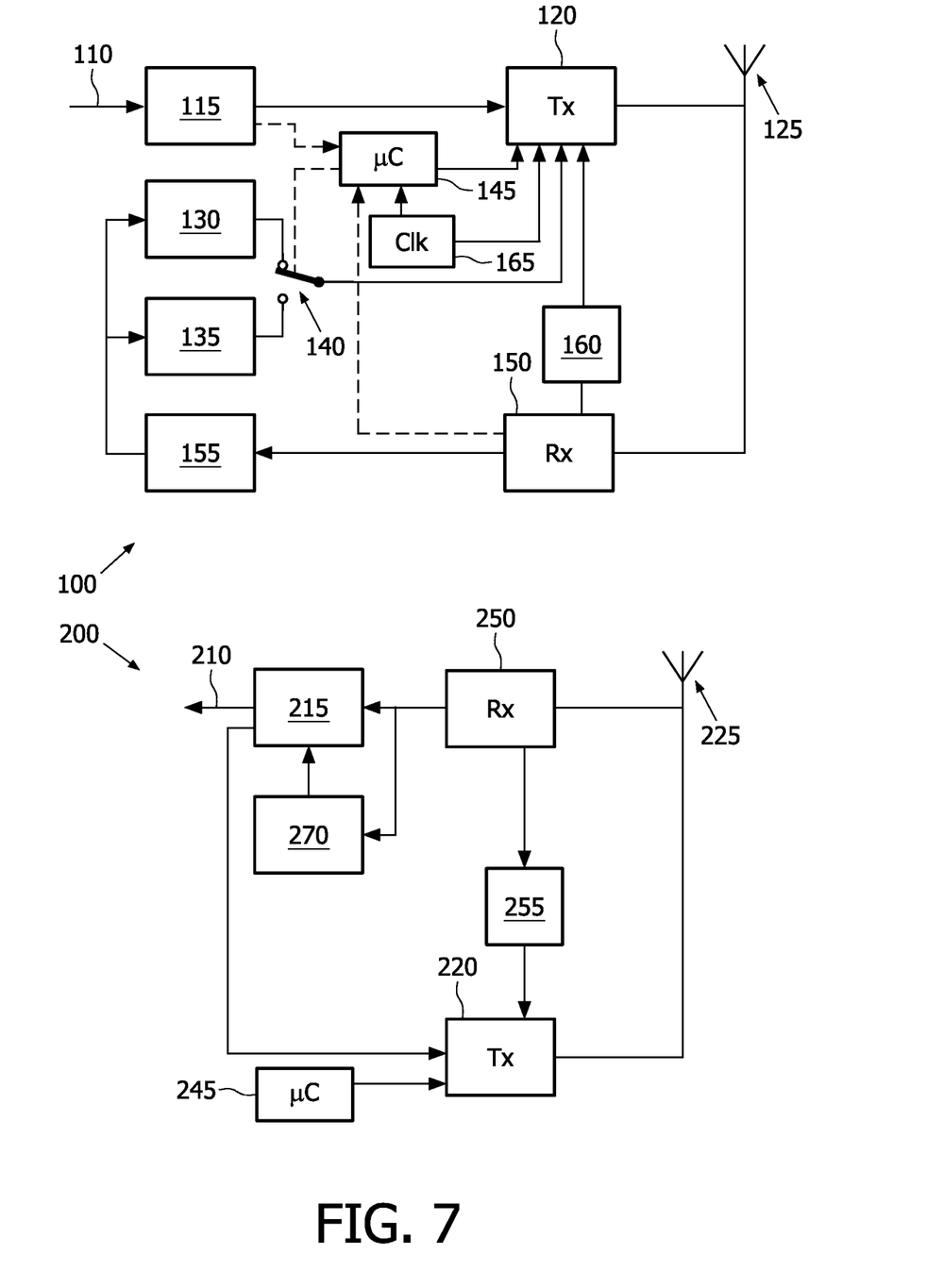
FIG. 7 is a block schematic diagram of a communication system.

Referring to FIG. 7, there is illustrated a radio communication system comprising a radio communication apparatus 100, hereafter referred to for convenience as a device 100, for transmitting data and a radio station 200 for receiving data.

The device 100 comprises an input 110 for receiving data to be transmitted. Coupled to the input 110 is a data formatting stage 115 for formatting the data into data packets for transmission in a time slot. An output of the data formatting stage 115 is coupled to an input of a transmitter 120 for transmitting the data packets as data signals, and an output of the transmitter 120 is coupled to an antenna 125. There is a clock generator (Clk) 165 for generating a timing reference corresponding to a periodic time slot, and an output of the clock generator 165 is coupled to the transmitter for controlling the time of transmission of the data signals within the time slots. The transmission of data signals is intermittent, being dependent on, for example, the availability of data at the input 110, or the availability of permission to transmit being granted by the radio station 200.

There is a first control signal generator 130 for generating a first control signal for transmission in those time slots that comprise a data signal, and optionally in some of the time slots that do not comprise a data signal, and a second control signal generator 135 for generating a second control signal for transmission in at least some of those time slots that do not comprise a data signal. Coupled to an output of each of the first and second control signal generators 130, 135, and to an input of the transmitter 120, there is a selector 140 for selecting for transmission either the first or second control signal. There is a controller (μC) 145, such as a microcontroller, for controlling the to state of the selector 140. The controller 145 may control the state of the selector 140 according to whether data is available for transmission, for which purpose the controller 145 may be coupled to the data formatting stage 115, or according to whether permission has been granted by an external device such as the receiving radio station 200, for which purpose the controller 145 may be coupled to a receiver 150 for receiving signals from the radio station 200. The controller 145 is also coupled to the clock generator 165 for the purpose of determining the instants at which to change the state of the selector 140, and to an input of the transmitter 120 for controlling the transmit power level of the transmitter 120.

The receiver (Rx) 150 is coupled to the antenna 125 for receiving radio signals from the radio station 200. An output of the receiver 150 is coupled to a power control command generator 155 for generating transmit power control (TPC) commands in response to measuring a parameter indicative of the quality of the radio signal received from the radio station 200, and an output of the power control command generator 155 is coupled to deliver the TPC commands to respective inputs of the first and second control signal generators 130, 135. The first and second control signal generators 130, 135 generate control signals having formats as herein described, including a portion which is a predetermined signal, such as pilot bits of predetermined values, and the TPC commands delivered by the power control command generator 155.

The receiver 150 is also coupled to a decoder 160 for decoding TPC commands received from the radio station 200, and an output of the decoder 160 is coupled to the transmitter 120 for delivering the decoded TPC to the transmitter 120 for control of its transmit power.

The radio station 200 comprises an antenna 225 coupled to a receiver 250 for receiving radio signals from the device 100. Coupled to an output of the receiver 250 is a decoder 215 for recovering data from data signals received from the device 100 and for recovering TPC commands from control signals received from the device 100. The decoder 215 also generates to acknowledgements in response to the recovered data. The decoder 215 has an output 210 for delivering the recovered data, and is coupled to a transmitter 220 for delivering the decoded TPC to the transmitter 220 for control of its transmit power, and for delivering the acknowledgements for transmission to the device 100.

Coupled to an output of the receiver 250 is a pilot signal processor 270, which may be implemented in, for example, a digital signal processor, for performing channel estimation on the predetermined signal portion contained in control signals received from the device 100. An output of the pilot symbol processor 270 is coupled to the decoder 215 to provide information, such as a phase reference or estimated channel parameters, to assist the recovering of data and control information from the received signals.

The receiver 250 is also coupled to a power control command generator 255 for generating transmit power control (TPC) commands in response to measuring a parameter indicative of the quality of the radio signals received from the device 100, and an output of the power control command generator 155 is coupled to deliver control signals comprising the TPC commands to the transmitter 220 for transmission to the device 100.

Coupled to the transmitter 220, the radio station 200 optionally comprises a controller (μC) 245, such as a microcontroller, for generating signals for transmission to the device 100 indicating that permission is granted to the device 100 to transmit data signals, or indicating changeover between the first and second subsets of time slots. The signals indicating permission may indicate a particular channel for the transmission of the data signals.

In FIG. 7, only those elements relevant to the understanding of the invention have been included. In practice, the device 100 and 200 may contain additional elements. For example, the device 100 may contain the elements required for receiving data transmitted by the radio station 200, and the radio station 200 may contain the elements required for transmitting data signals to the device 100.

The increase in the proportion of control signal used for power control to bits may be initiated by the device 100. In this case the initiation of the increase may be in response to the device 100 determining that there is no data to transmit (for example on the E-DCH and HS-DPCCH) in a particular time slot or group of time slots. Alternatively, initiation of the increase may be in response to the device 100 having no permission to transmit data, or in response to a combination of the device 100 having no data to transmit on one channel (e.g. HS-DPCCH) and the device 100 having no permission to transmit data on another channel (e.g. E-DCH).

Initiation of the increased proportion of control signal used for power control bits may be further dependent on the device 100 being in communication with only one radio station 200 (e.g. a base station), or with multiple radio stations 200 where all the radio stations 200 are of a single type or capability. Initiation of the increase may be further dependent on the device 100 being granted permission by one or more radio stations 200 to initiate the increase1 in the event of the relevant criterion becoming satisfied.

Alternatively, initiation of the increased proportion of control signal used for power control bits may be in response to the device 100 receiving an instruction from the radio station 200 to initiate the increase, where the radio station 200 determines when to send the instruction by means of determining whether the device 100 has data to transmit and/or permission to transmit data. The determining of whether the device 100 has data to transmit may, for example, be responsive to a single-bit indication that the device 100 considers or does not consider the currently-granted permission to transmit at a particular bit rate or power to be sufficient, for example using the single-bit indication known in the UMTS specifications as the "happy bit". The radio station 200 may further take into account whether the device 100 is in communication with another radio station 200, and if so, what capabilities are possessed by the or each other radio station 200. For example, the radio station 200 may take into account whether the or each other radio station 200 has the capability to receive the increased proportion of control signal used for power control bits.

In each case, the device 100 may reduce again the proportion of control to signal used for power control bits in response to a different criterion. For example, the device 100 may reduce the proportion of control signal used for power control bits in response to the device 100 determining that there is some data to transmit (for example on one or both of the E-DCH and the HS-DPCCH) in a particular time slot or group of time slots, or in response to receiving permission to transmit data, or in response to receiving an instruction from the radio station 200 to reduce the proportion of control signal used for power control bits where the radio station 200 determines when to send the instruction by means of determining whether the device 100 has data to transmit and/or permission to transmit data.

In some cases, one or more of the radio stations 200 may be unaware that the proportion of control signal used for power control bits has been increased. In such cases, it may be necessary for the radio station 200 to detect blindly whether the proportion has been increased or not.

Although the invention has been described with reference to UMTS, its use is not limited to UMTS.

In a mobile communication system, the invention is applicable to the transmission of data and control signals on an uplink, that is from a mobile equipment to an equipment of fixed location, or on a downlink, that is in the reverse direction. Therefore, either of the device 100 and the radio station 200 may be suitable for mobile operation. The elements of an equipment intended for operation at a fixed location may be co-located or distributed.

In the control signal formats illustrated in FIGS. 1 to 6, the portion which is a predetermined signal is referred to as pilots bits. In general, this portion is not limited to signals that can be represented as bits.

The examples of control signals presented in the specification include one or more pilot bits of predetermined value and one or more bits for conveying power control commands. These are the fields that are relevant to the invention. These examples are not intended to exclude the presence of other bits in the control signals, for example a Transmission Format Combination Indicator (TFCI) for indicating the format of the data, or a to Feedback Indicator (FBI) for signalling other parameters of relevance to the communication.

The examples of control signals presented in the specification are not intended to be exhaustive; other signals can be formulated within the constraints defined.

In addition to the changes of energy in accordance with the invention, there may be, superimposed, changes in transmit power level due to the operation of closed loop power control.

Although the invention has been described in relation to an apparatus transmitting a single data channel and associated control channel, the invention is also applicable when a plurality of data channels is transmitted, the data channels each having an associated control channel. In this case, each data channel and control channel pair may be operated in accordance with the invention independently; the transmission or otherwise of data on one channel does not affect the choice of control channel signal transmitted for the other data channels.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and which may be used instead of or in addition to features already described herein.

The invention claimed is:

1. A method of operating a radio communication apparatus for use with a communication channel divided into a plurality of time slots, and at least one radio station for receiving signals transmitted by the radio communication apparatus, the method comprising:
   transmitting data in a first subset of the time slots;
   refraining from transmitting data in a second subset of the timeslots;
   transmitting a control signal in each of the time slots, wherein the control signal in the first subset of time slots comprises at least one bit constituting a power control command and a portion which is a predetermined signal; and
   for at least some of the second time slots, and relative to the first time slots,
   adjusting between control signal formats, at least some of the time when the data is not transmitted during the second subset of the timeslots, by increasing the proportion of the bits of the control signal which constitutes a power control command and reducing the proportion of the bits of the control signal which constitutes a predetermined signal portion and reducing the energy of the control signal at least by reducing the energy of the predetermined signal portion by a factor in proportion to the reduction of the number of bits constituting the predetermined signal portion
   determining, at the radio station, that the radio communication apparatus has no data to transmit in a particular time slot or group of time slots, and/or that the radio communication apparatus has no permission to transmit data; and
   in response to said determining, optionally transmitting an indication to the radio communication apparatus.

2. The method as claimed in claim 1, wherein reducing the energy of the control signal comprises reducing the duration of the predetermined signal portion.

3. The method as claimed in claim 1, wherein reducing the energy of the control signal comprises reducing the transmitted power level of the control signal.

4. The method as claimed in claim 1, wherein reducing the energy of the control signal comprises discontinuing transmission of the control signal during a portion of the time slot.

5. The method as claimed in claim 4, comprising, during the time slots comprising the discontinuous transmission, confining the transmission of the control signal to either or both ends of the time slot.

6. The method as claimed in claim 1, wherein, during the at least some of the second time slots, the predetermined signal portion comprises a number of bits of predetermined value, and the number of bits of predetermined value is equal to the number of bits which constitute a power control command.

7. The method as claimed in claim 1, wherein, during the at least some of the second time slots, the predetermined signal portion of the control signal comprises a first plurality of bits of predetermined value, and the control signal comprises a second plurality of bits constituting a power control command, and wherein the first and second plurality of bits are interleaved.

8. The method as claimed in claim 1, wherein, during the at least some of the second time slots, the predetermined signal portion is omitted.

9. The method as claimed in claim 1, wherein increasing the proportion of control signal which constitutes a power control command and reducing the energy of the control signal is in response to determining that the radio communication apparatus has no data to transmit in a particular time slot or group of time slots.

10. The method as claimed in claim 1, wherein increasing the proportion of the control signal which constitutes a power control command and reducing the energy of the control signal is in response to determining that the radio communication apparatus has no permission to transmit data.

11. The method as claimed in claim 1, wherein increasing the proportion of the control signal which constitutes a power control command and reducing the energy of the control signal is in response to determining that the radio communication apparatus has no data to transmit on one channel for which the radio communication apparatus has permission to transmit, and has no permission to transmit data on another channel.

12. The method as claimed in claim 1, wherein increasing the proportion of the control signal which constitutes a power control command and reducing the energy of the control signal is in response to determining that the radio communication apparatus is in communication with a single station receiving its transmitted control signals and data, or with a plurality of such stations sharing a predetermined common property.

13. A method of operating a communication system comprising a radio communication apparatus and at least one radio station for receiving signals transmitted by the radio communication apparatus, the method comprising:
operating the radio communication apparatus comprising:
transmitting data in a first subset of the time slots;
refraining from transmitting data in a second subset of the timeslots;
transmitting a control signal in each of the time slots, wherein the control signal in
the first subset of time slots comprises at least one bit constituting a power control command and a portion which is a predetermined signal; and
for at least some of the second time slots, and relative to the first time slots,
adjusting between control signal formats, at least some of the time when the data is not transmitted during the second subset of the timeslots, by increasing the proportion of the bits of the control signal which constitutes a power control command and reducing the proportion of the bits of the control signal which constitutes a predetermined signal portion and reducing the energy of the control signal at least by reducing the energy of the predetermined signal portion by a factor in proportion to the reduction of the number of bits constituting the predetermined signal portion
determining, at the radio station, that the radio communication apparatus has no data to transmit in a particular time slot or group of time slots, and/or that the radio communication apparatus has no permission to transmit data; and
in response to said determining, optionally transmitting an indication to the radio communication apparatus.

14. The method as claimed in claim 13, wherein transmitting the indication is further dependent on a capability of a further radio station receiving signals transmitted by the radio communication apparatus.

15. The method as claimed in claim 14, wherein the capability is the ability to control a transmitter of the further radio station in accordance with the increased proportion of the control signal which constitutes a power control command.

16. A radio communication apparatus for use with a communication channel divided into a plurality of time slots, and at least one radio station for receiving signals transmitted by the radio communication apparatus, the method comprising:
at least one processor of the apparatus operative to:
transmit data in a first subset of a plurality of time slots and refraining from transmitting data in a second subset of the plurality of time slots;
generate a first control signal, wherein the first control signal comprises a portion which is a predetermined signal and at least one bit constituting a power control command;
transmit the first control signal in the first subset of time slots;
generate a second control signal,
adjust between control signal formats, at least some of the time when the data is not transmitted during the second subset of the plurality of timeslots, by providing an increased proportion of the bits of the control signal which constitutes a power control command, relative to the first control signal and providing a decreased proportion of the bits of the control signal which constitutes a predetermined signal portion and reducing the energy of the control signal at least by reducing the energy of the predetermined signal portion by a factor in proportion to the reduction of the number of bits constituting the predetermined signal portion transmit the second control signal in at least some of the second subset of time slots and with, relative to the transmission of the first control signal, a reduced energy, wherein the reduction comprises at least a reduction in the energy of the predetermined signal portion
at least one processor of the radio station operative to:
determine that the radio communication apparatus has no data to transmit in a particular time slot or group of time slots, and/or that the radio communication apparatus has no permission to transmit data; and in response to said determining, optionally transmit an indication to the radio communication apparatus.

17. The apparatus as claimed in claim 16, wherein the means for generating the second control signal is adapted to generate the second control signal having the predetermined signal portion of shorter duration that the predetermined signal portion of the first control signal.

18. The apparatus as claimed in claim 16, wherein the means for transmitting the second control signal is adapted to transmit the second control signal at a lower power level than the transmission of the first control signal.

19. The apparatus as claimed in claim 16, wherein the means for transmitting the second control signal is adapted to discontinue transmission of the second control signal during a portion of the time slot.

20. The apparatus as claimed in claim 19, wherein the means for transmitting the second control signal is adapted to confine the transmission of the second control signal to either or both ends of the time slot.

21. The apparatus as claimed in claim 16, wherein the means for generating the second control signal is adapted to generate the second control signal in which the predetermined signal portion comprises a number of bits of predetermined value, and the number of bits of predetermined value is equal to the number of bits constituting a power control command.

22. The apparatus as claimed in claim 16, wherein the means for generating the second control signal is adapted to generate the predetermined signal portion as a first plurality of bits of predetermined value, and to generate a second plurality of bits constituting a power control command, wherein the first and second plurality of bits are interleaved.

23. The apparatus as claimed in any claim 16, wherein the means for generating the second control signal is adapted to generate the second control signal having the predetermined signal portion omitted.

24. The apparatus as claimed in claim 16, wherein the means for generating the second control signal, and the means for transmitting the second control signal, is responsive to a received indication.

25. A radio communication system comprising a radio communication apparatus as claimed in claim 24, and a radio station having control means for determining that the radio communication apparatus has no data to transmit in a particular time slot or group of time slots, and/or that the radio communication apparatus has no permission to transmit data, wherein the control means is adapted to initiate transmission of the indication in response to said determining.

26. A radio communication apparatus for use with a communication channel divided into a plurality of time slots, and at least one radio station for receiving signals transmitted by the radio communication apparatus, the method comprising:
at least one processor operative to:
transmit data in a first subset of a plurality of time slots and refraining from transmitting data in a second subset of the plurality of time slots;

generate a control signal according a first control signal format, wherein the control signal comprises a portion which is a predetermined signal and at least one bit constituting a power control command;

transmit the control signal according to the first control signal format in the first subset of time slots;

adapt a control signal format from the first control signal format to a second control signal format, when the data is not transmitted during the second subset of the plurality of time slots, by providing an increased proportion of the bits of the control signal which constitutes a power control command, relative to the first control signal format and providing a decreased proportion of the bits of the control signal which constitutes a predetermined signal portion and reducing the energy of the control signal at least by reducing the energy of the predetermined signal portion by a factor in proportion to the reduction of the number of bits constituting the predetermined signal portion transmit the control signal in accordance with the second control signal format in at least some of the second subset of time slots and with, relative to the transmission of the control signal in accordance with the second control signal format, a reduced energy, wherein the energy reduction comprises at least a reduction in the energy of the predetermined signal portion at least one processor of the radio station operative to:

determine that the radio communication apparatus has no data to transmit in a particular time slot or group of time slots, and/or that the radio communication apparatus has no permission to transmit data; and in response to said determining, optionally transmit an indication to the radio communication apparatus.

27. A radio communication apparatus for use with a communication channel divided into a plurality of time slots, and at least one radio station for receiving signals transmitted by the radio communication apparatus, the method comprising:

at least one processor of the apparatus operative to:

transmit data in a first subset of a plurality of time slots and refraining from transmitting data in a second subset of the plurality of time slots; generate a first control signal, wherein the first control signal comprises a portion which is a predetermined signal and at least one bit constituting a power control command;

transmit the first control signal in the first subset of time slots;

generate a second control signal, switch from the first control signal to the second control signal, when the data is not transmitted during the second subset of the plurality of time slots, by providing an increased proportion of the bits of the control signal which constitutes a power control command, relative to the first control signal, of the second control signal which constitutes the power control command; and providing a decreased proportion of the bits of the control signal which constitutes a predetermined signal portion, and reducing the energy of the control signal, relative to the first control signal, of the second control signal which constitutes the power control command at least by reducing the energy of the predetermined signal portion by a factor in proportion to the reduction of the number of bits constituting the predetermined signal portion transmit the second control signal in at least some of the second subset of time slots and with, relative to the transmission of the first control signal, a reduced energy, wherein the energy reduction comprises at least a reduction in the energy of the predetermined signal portion at least one processor of the radio station operative to:

determine that the radio communication apparatus has no data to transmit in a particular time slot or group of time slots, and/or that the radio communication apparatus has no permission to transmit data; and in response to said determining, optionally transmit an indication to the radio communication apparatus.

\* \* \* \* \*